Aug. 6, 1935.  J. EDGAR  2,010,353
HOB
Filed June 30, 1930  2 Sheets-Sheet 1
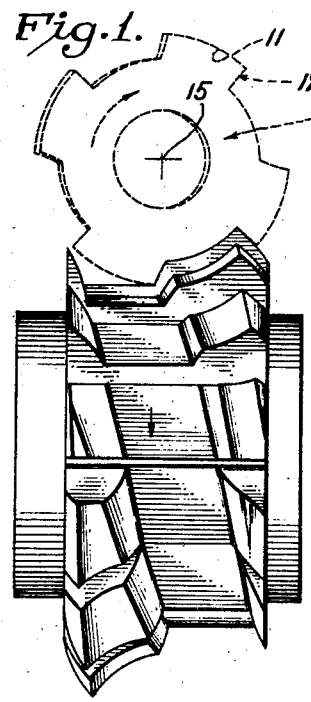
Fig.1.
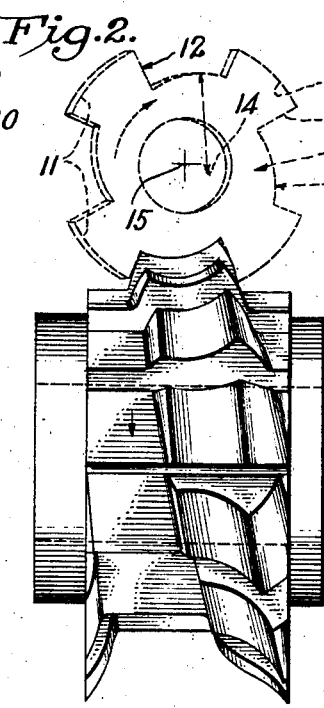
Fig.2.
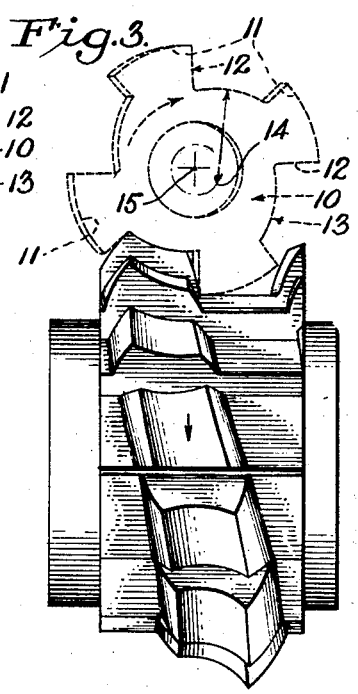
Fig.3.
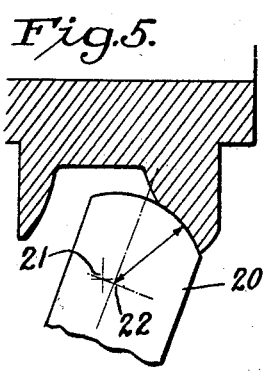
Fig.5.
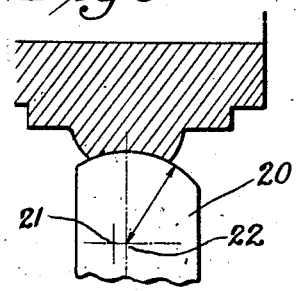
Fig.5ª.
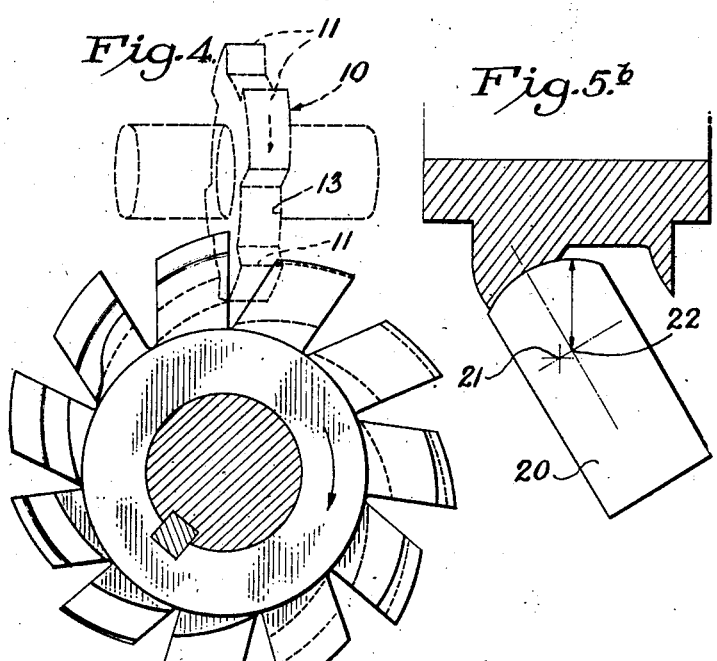
Fig.4.  Fig.5.b
INVENTOR
John Edgar
BY
ATTORNEYS Aug. 6, 1935.                J. EDGAR                2,010,353
                                HOB
                         Filed June 30, 1930        2 Sheets-Sheet 2
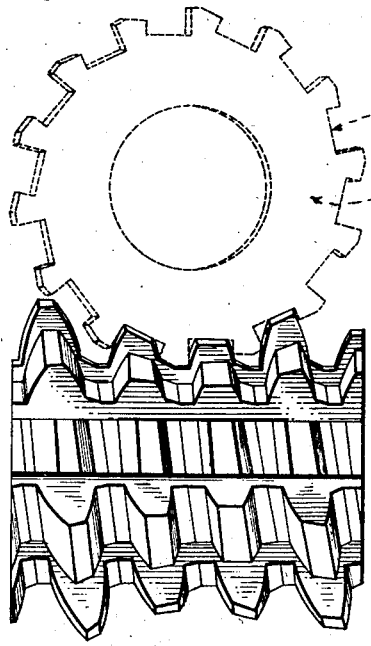
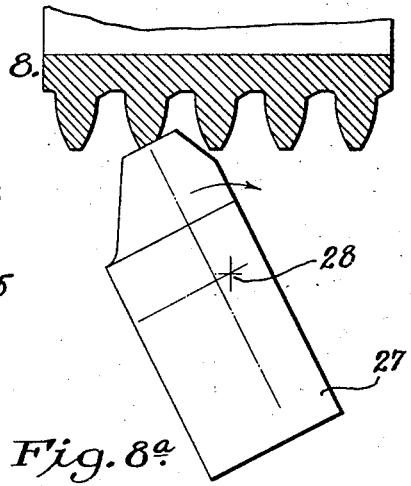
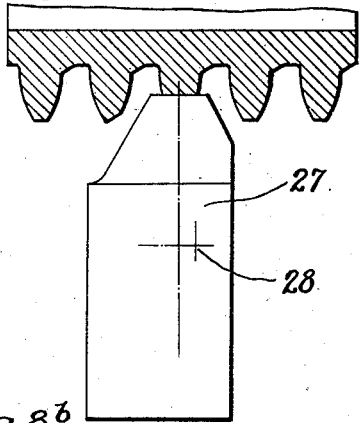
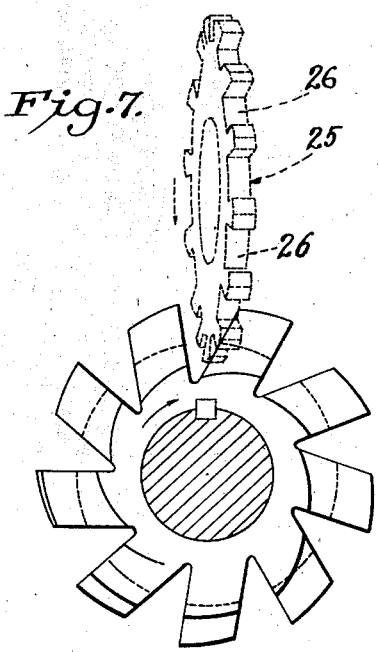
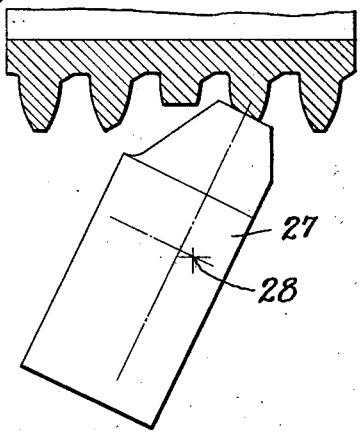
INVENTOR
John Edgar
BY
ATTORNEYS Patented Aug. 6, 1935

2,010,353

UNITED STATES PATENT OFFICE 2,010,353

HOB

John Edgar, Rockford, Ill., assignor to Barber-Colman Company, Rockford, Ill., a corporation of Illinois Application June 30, 1930, Serial No. 464,856

11 Claims. (Cl. 29—103)

This invention relates in general to metal cutting tools and more particularly to hobs for cutting ratchets or the like, and the method of making the same.

In ratchets, or the like, the root portions between the teeth sometimes are other in form than cylindrical and concentric about the axis of the ratchet. Thus, these root portions may be cylindrical but eccentric to the axis of the ratchet. In this instance, each root portion has a different center, but the respective centers are similarly spaced about the axis of the ratchet. The root portions also may be non-cylindrical in form, as for example in the form of plane surfaces.

Heretofore, it has been impossible to hob ratchets of the general form in which the root portions were other than cylindrical and concentric with the axis of rotation without developing large fillets at the junctions of the root portions and the sides of the teeth. This fault was particularly pronounced where the tooth depth was great as compared with the width of the tooth space.

It is, therefore, the general object of the invention to provide an improved hob of the type required to generate ratchets, and the like, of the above described form.

Another object is to provide such a hob which will generate a ratchet having no objectionable fillets between the sides of the teeth and the root portions.

A further object is to provide a new method of making a hob having the above-mentioned characteristics.

Other objects and advantages will become apparent from the following detailed description taken in connection with the accompanying drawings, in which:

Figures 1, 2 and 3 are views of a hob embodying the features of the invention, and shown in progressive operative relation to a ratchet.

Fig. 4 is an end elevation of the hob with the ratchet generated thereby shown in dotted lines in operative relation thereto.

Figs. 5, 5ᵃ and 5ᵇ are fragmentary radial sections illustrating the positions of the tool in forming the hob.

Fig. 6 is a view similar to Fig. 4 showing a modified form of hob with the ratchet generated thereby shown in dotted lines in operative relation thereto.

Fig. 7 is an end elevation of the hob shown in Fig. 6, with the ratchet produced thereby shown in dotted lines.

Figs. 8, 8ᵃ and 8ᵇ illustrate various positions of the tool in forming the modified form of hob.

While the invention is susceptible of various modifications and alternative constructions, I have shown in the drawings and will herein describe in detail a preferred embodiment together with a modified form thereof, but it is to be understood that I do not thereby intend to limit the invention to the specific forms disclosed, but intend to cover all modifications and alternative constructions falling within the spirit and scope of the invention as expressed in the appended claims.

Heretofore, hobs for generating ratchets were unable to generate the root portion with sharp corners between the sides of the teeth and the root portion. The outer ends of the hob teeth form the root portion of the ratchet, while the sides of the hob teeth form the sides of the ratchet teeth. Hence, in order to give the desired shape to the root portion of the ratchet, it is necessary to modify the outer ends of the hob teeth. In the improved hob, herein disclosed, the outer ends of the hob teeth are so modified that they will form the desired root portion of the ratchet, and this is accomplished by a separate and additional operation in forming the hob.

The ratchet 10, illustrated in Figs. 1 to 4 of the drawings, has teeth 11 with straight sides, one of which generally lies on a radius as shown at 12 in order to provide a proper abutment for a cooperating pawl (not shown). Between each pair of adjacent teeth 11, the bottom or root portion 13 is circular in form with its center 14 offset a predetermined distance from the axis 15 of the ratchet. Each root portion 13 has a different center 14, but all the centers 14 are similarly disposed relative to the axis 15 of the ratchet so that they lie in a circle concentric to the axis 15.

To generate this ratchet, a hob is first produced which is standard in all respects except that the tooth depth is greater than necessary to produce a root portion of a predetermined shape, in order to produce keys having straight sides extending to said root portion. The interfering portions of the teeth then are turned off, thereby superimposing a milling cutter on the teeth.

In forming the milling cutter which is superimposed upon the teeth, a form tool 20 (Figs. 5, 5ᵃ and 5ᵇ) is employed to turn off the outer ends of the elongated teeth of the hob. This form tool has a circular contour having a center 22 and a radius substantially equal to the radius of the root portions 13 of the ratchet to be generated.

For the turning operation, the hob is rotated about its own axis, and the form tool 20 is mounted with its effective cutting edge in an axial plane of the hob, and is partially swung in said plane on an axis 21 bearing the same relation to the center 22 that the axis 15 of the ratchet bears to the center 14 of the root portion. This swinging of the tool is through an angle equal to the circular pitch of the teeth of the ratchet for a revolution of the hob.

Theoretically, the tool should lie in a plane perpendicular to the helix of the hob in order to form a groove or depression therein of a circular contour in said plane, and the swinging of the tool should be in said plane. Thus, a groove would be cut having an elliptical contour in an axial plane. But a close approximation of such form can be obtained by swinging the tool in an axial plane as described, and making the radius of the circular contour of the tool slightly greater than that theoretically required.

This turning operation cuts a peripheral spiral groove in the hob by removing varying portions of the teeth of the hob, the centers of the circular depressions in the teeth being variable in position relative to the center of rotation 21 of the tool 20.

In Figs. 6 and 7 a modified form of hob is shown which is adapted to generate a ratchet 25 in which the root portion 26 is straight. For this hob, a form tool 27, which is used to turn away the interfering portions of the teeth, (Figs. 8, 8ª and 8ᵇ) has a form corresponding to the root portion 26 of the ratchet 25, which form is a straight line, and the tool is swung during the turning operation about an axis 28 corresponding to the axis of the ratchet 25 in the same manner as was previously described.

It is apparent from the foregoing that a new and improved hob has been provided which will generate a ratchet or the like having a root portion other in form than cylindrical and concentric with the axis of the ratchet, and having no objectionable fillets between the sides of the teeth and the root portions of the ratchet. It is also evident that a novel method has been provided for forming such a hob.

I claim as my invention:

1. A hob of the character described comprising a threaded and gashed blank having relieved teeth, said blank having a peripheral groove having a circular contour in an axial plane, the circular contour in different axial planes having the same radius but a center variable in position relative to the hob.

2. A hob of the character described comprising a threaded and gashed blank having relieved teeth, said blank having a peripheral groove having a transverse circular contour, the radius of said contour in different transverse planes along said groove being the same but the center of said contour being variable in position in timed relation to the lead of the hob helix.

3. A hob comprising elongated teeth to generate tooth sections of a ratchet or the like to a predetermined depth and having a peripheral groove the successive transverse contours of which are arcuate about centers that are spaced from and located progressively at different points about an axis which corresponds to the axis of the ratchet.

4. A hob comprising elongated teeth to generate tooth sections of a ratchet or the like to a predetermined depth and having a peripheral groove the transverse contour of which has a radius substantially equal to the radius of the root portion between said tooth sections and a center moving in a circle corresponding to the circle in which the centers of the root sections lie about the axis of the ratchet.

5. A hob comprising elongated teeth to generate tooth sections of a ratchet or the like to a predetermined depth and having a peripheral groove the transverse contour of which has a center which in the generation of the groove moves about an axis corresponding to the axis of the ratchet and through an angle equal to the circular pitch of the ratchet for a revolution of the hob.

6. A hob comprising teeth to generate tooth sections of a ratchet or the like and having a peripheral groove the successive transverse contours of which are arcuate about centers located progressively along a helix about a circular line which is concentric with the hob axis and which is located in a transverse plane of the hob.

7. A hob for generating a ratchet or the like comprising elongated teeth having a groove cut therein for forming the root portions of the ratchet, the contour of the groove in axial planes of the hob having a fixed spaced relation to a helix about a circular line coaxial with the hob.

8. A hob for generating teeth, said hob comprising teeth having a peripheral groove, the centers of curvature of the contours of said groove taken in transverse planes to the groove lying in a helix, the axis of which is a circle concentric with the hob.

9. A hob comprising a series of uniformly peripherally spaced relieved teeth separated by transverse gashes and arranged in a helical thread of constant lead, and a peripheral groove intersecting the outer ends of said teeth and having a constant lead the same in direction as but less in degree than the thread lead.

10. A hob comprising a series of relieved teeth arranged in a helical thread having a predetermined lead, and a peripheral groove intersecting said teeth and having a predetermined lead the same in direction as but differing in degree from the thread lead.

11. A hob comprising a cylindrical body, a series of relieved teeth arranged in a helical peripheral thread about said body, the tops of said teeth being cut away progressively along a helix having a different lead than said thread.

JOHN EDGAR.